April 25, 1950 — R. S. HUNTER — 2,504,982
SIGNALING MIRROR
Filed July 14, 1944 — 4 Sheets-Sheet 1
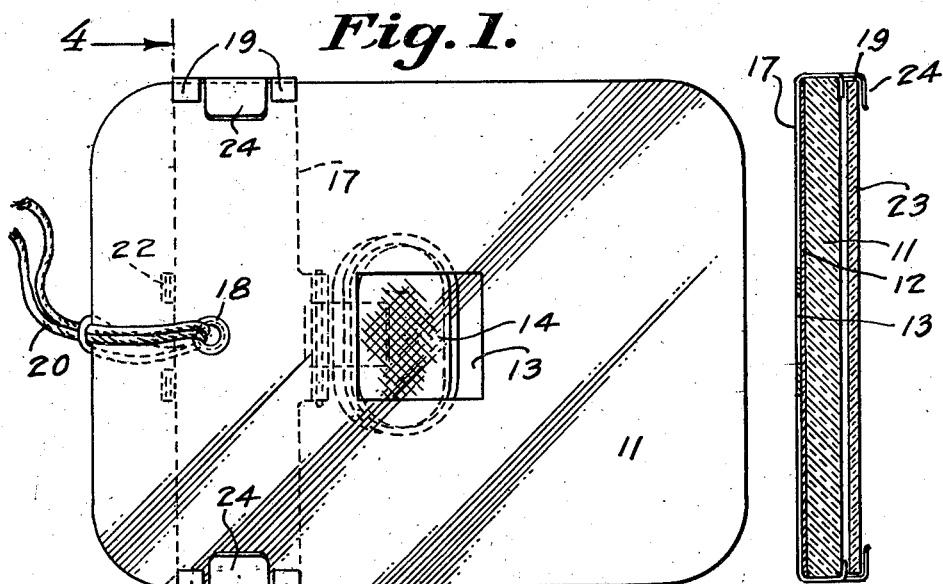
Fig. 1.
Fig. 4.
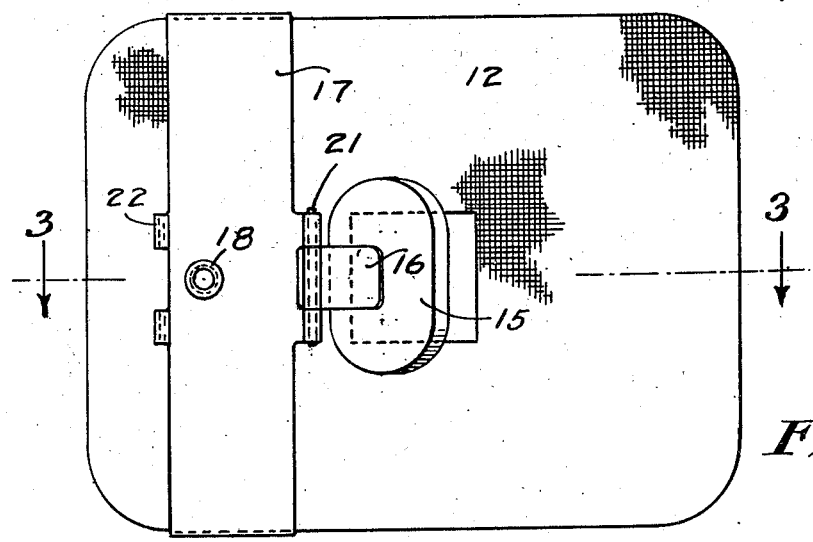
Fig. 2.
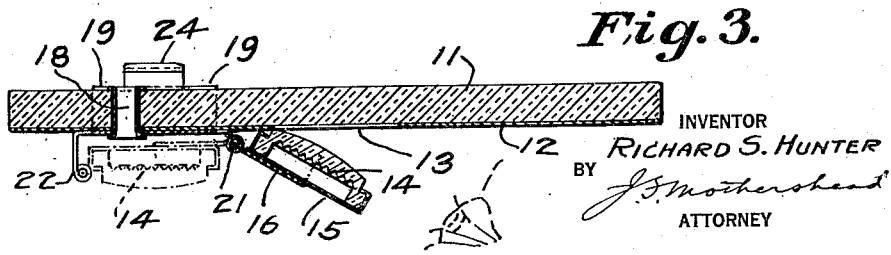
Fig. 3.
INVENTOR
RICHARD S. HUNTER
BY
ATTORNEY April 25, 1950  R. S. HUNTER  2,504,982
SIGNALING MIRROR
Filed July 14, 1944  4 Sheets-Sheet 2
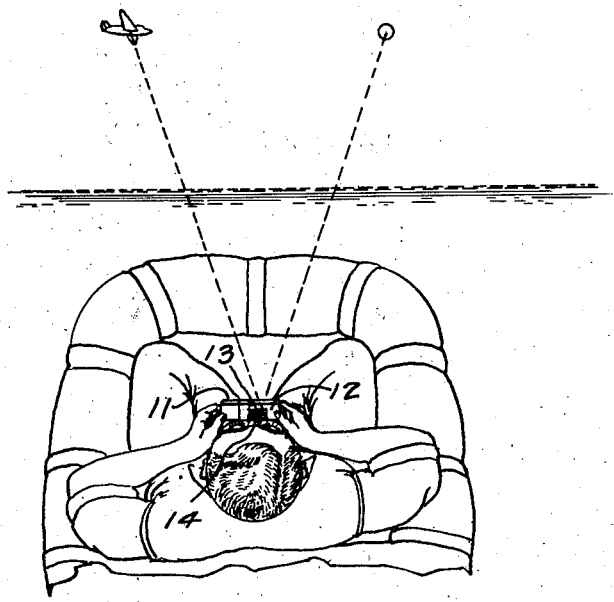
Fig. 7.
Fig. 5.
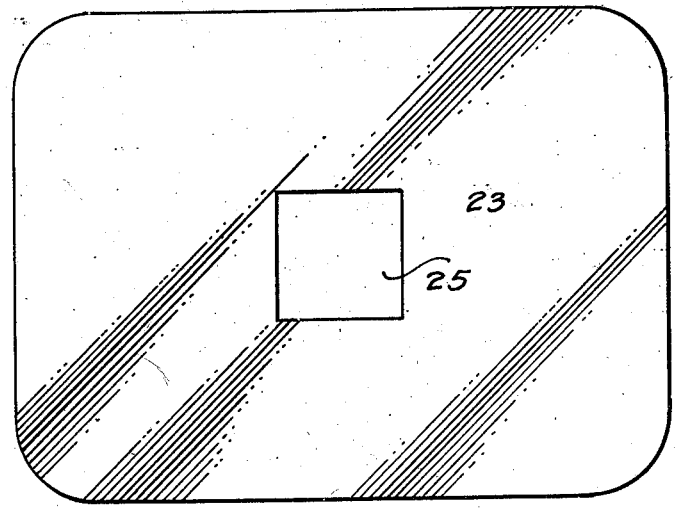
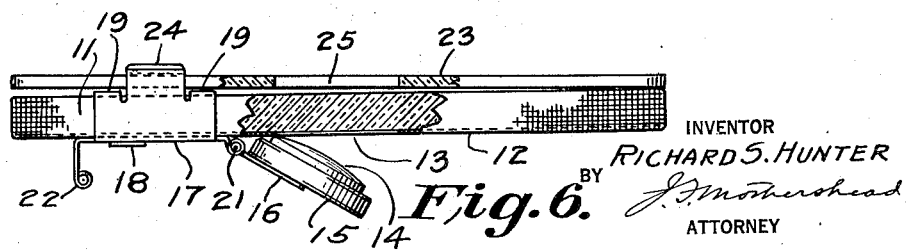
Fig. 6.
INVENTOR
RICHARD S. HUNTER
BY
ATTORNEY April 25, 1950  R. S. HUNTER  2,504,982
SIGNALING MIRROR Filed July 14, 1944  4 Sheets-Sheet 3

INVENTOR
RICHARD S. HUNTER
BY
ATTORNEY

April 25, 1950     R. S. HUNTER     2,504,982
SIGNALING MIRROR

Filed July 14, 1944     4 Sheets-Sheet 4

INVENTOR
RICHARD S. HUNTER
BY
ATTORNEY

Patented Apr. 25, 1950

2,504,982

UNITED STATES PATENT OFFICE 2,504,982

SIGNALING MIRROR

Richard S. Hunter, Franklin Park, Va., assignor to the United States of America as represented by the Secretary of Commerce Application July 14, 1944, Serial No. 544,969

5 Claims. (Cl. 116—20)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

My invention relates to an improved signaling mirror by means of which a reflected beam of sunlight may be accurately and quickly directed from life rafts or small water craft upon an aircraft, water craft, lighthouse, or the like, as well as for signaling on land, as between survey parties.

In the accompanying drawings—

Figure 8:
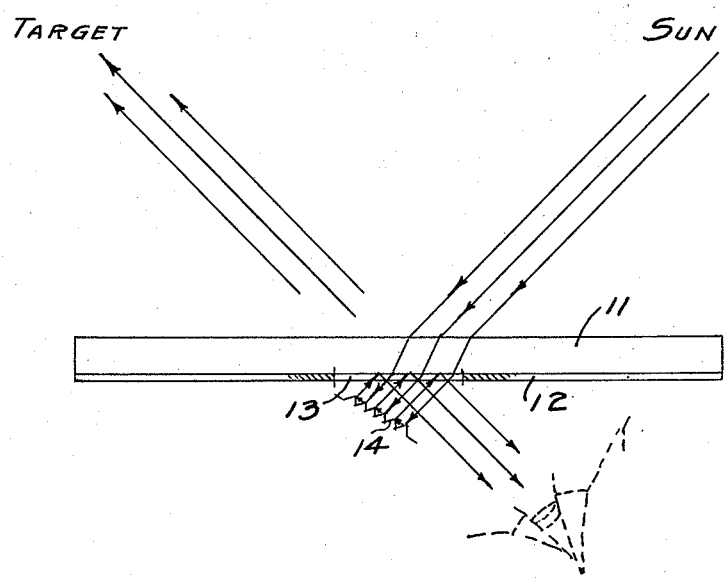
Figure 9:
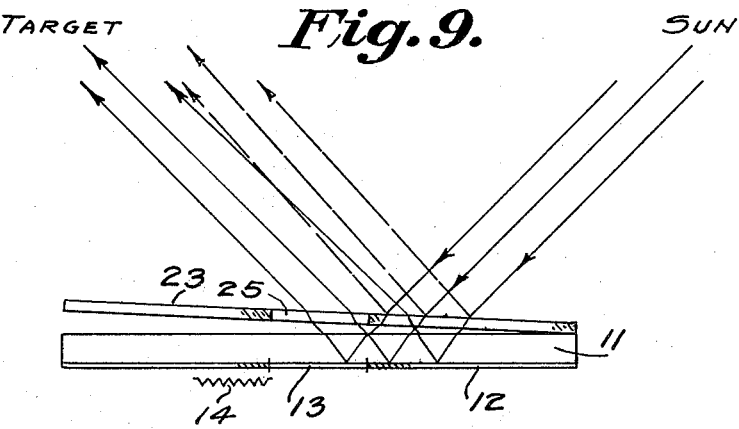
Figure 10:
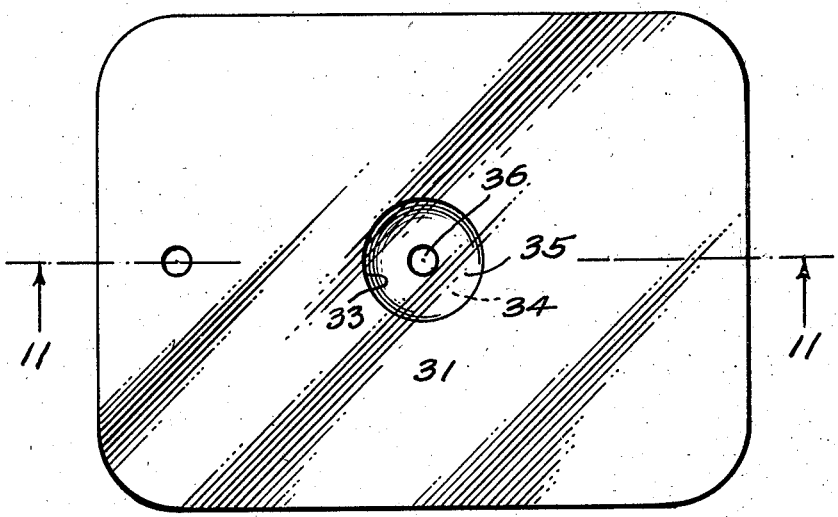
Figure 11:
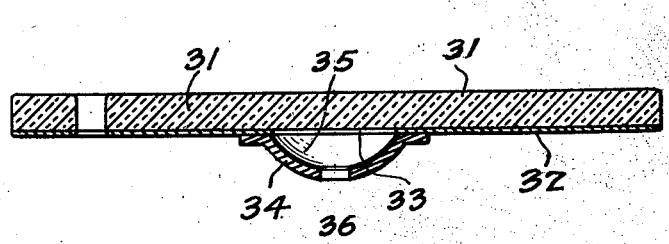

Figure 1 is a plan view of my device.
Figure 2 is a rear view.
Figure 3 is a section on line 3—3 of Figure 2.
Figure 4 is a section on line 4—4 of Figure 1.
Figure 5 is a plan view of one of my color screens.
Figure 6 is a side elevation, partly in section, with one of my color screens in position.
Figure 7 illustrates the method of using my signaling mirror.
Figure 8 is a diagrammatic view showing the directions of reflection and refraction of the sun to the eye.
Figure 9 is a diagram showing the directions of reflection of sunlight from the mirror and surface of color screen.
Figure 10 is a plan view of a signaling mirror provided with a dome-shaped retrodirective aiming reflector.
Figure 11 is a section on line 11—11 of Figure 10.

In these drawings—

A mirror 11 has a reflecting back 12 in which there is a sighting opening 13. A retrodirective reflector 14 in a frame 15 is mounted on a hinge 16 having an attaching leaf 17 which is secured to the rear of the mirror 11 by means of a tubular rivet 18 and mirror-engaging clamp 19. The tubular rivet 18 serves also as a means for attaching the mirror 11 by a suitable cord 20. My reflector 14 is shown in operative position in Figure 2 and in full lines in Figure 3, the latter view showing that the pintle 21 of the hinge 16 is at a distance from the mirror back less than the thickness of my reflector 14 and frame 15, whereby the minimum angle between the mirror back and the frame 15 is predetermined. The folded position of my reflector 14 is indicated in dotted lines in Figure 3, the frame 15 being secured by a pair of resilient catches 22 formed from the hinge leaf 17. A color screen 23 (Figures 4, 5 and 6) is detachably secured in front of my mirror 11 by opposed resilient clips 24 (Figures 1, 3, 4 and 6). The color screen 23 is for use in sending color signals and I have found the colors red, green and orange suitable for this use. It will be apparent from an inspection of Figures 6 and 9 that the color screen 23 makes a substantially linear contact with my mirror 11 at the right-hand edge of these figures; that the cord 20 and clamps 19 hold it out of contact with the mirror 11 at other points. This is for the purpose of separating the colored beam of reflected light from the white light reflected from the front surface of the color screen.

I have shown in Figure 9 the manner in which light reflected by the screen will proceed in a different direction from that taken by light reflected from the mirror itself. This separation of the colored and uncolored beams of reflected light I have found necessary to avoid serious dilution of the color of the signal.

In Figures 10 and 11 the mirror 31 has a reflecting back 32 in which there is a sight opening 33. Directly behind the opening 33 is a dome-shaped aiming device 34 provided with a colored lining of "Scotchlite" 35 with a sighting opening 36 at the apex of the device.

A "Scotchlite" sample which has been used to make experimental signaling mirrors is a thin flexible colored sheet in the face of which are imbedded numerous glass spheres substantially uniform in size. Structurally, this material resembles a very fine grade of sandpaper. This trademark was applied to a product of the Minnesota Mining and Manufacturing Company, which product forms an element of the novel combination disclosed herein. This product is clearly disclosed in Patents Nos. 2,354,018 (Heltzer et al.), and 2,326,634 (Gebhard et al.)—the latter disclosing a plurality of high-angularity retrodirective beads suitable for use in combination with other elements of my device. A more perfect device may be made by forming this retrodirective coating directly on the inner surface of my dome-shaped device 34.

The form of aiming device disclosed in Figures 1 to 7, inclusive, can be aimed only when the retrodirective button faces approximately toward the sun. It is necessary, therefore, that the signaler using this type of mirror turn it so that the button faces approximately toward the sun before he attempts to signal.

With the modified aiming device illustrated in Figures 10 and 11, I have eliminated the necessity for this preliminary adjustment.

With my dome-shaped signaling mirror, the effective part of the retrodirective area will face the sun regardless of the rotation of the mirror with respect to the sun. The signaler need only sight through the opening 33 and tilt the mirror until the colored virtual image of the sun appears to be on the target. This materially expedites aiming the mirror as well as the subsequent holding of the beam on the target, which is very important when signaling to aircraft which move at high speeds across the sky and remain in view for very brief intervals.

It should be understood that the present disclosure is for the purpose of illustration only, and that the invention includes all modifications and equivalents which fall within the spirit and scope of the appended claims in which it is my intention to claim all novelty inherent in my invention as broadly as possible in view of the prior art.

What I claim is:

1. A signaling device including a mirror provided with a window, a concave dome-shaped closure under and covering said window, a transparent light reflecting sheet supported on the concave surface of said dome and a multiplicity of precision retroreflectors in the form of high angularity retrodirective beads partially embedded in said sheet, the said closure being provided with a central sighting opening.

2. A signaling device including a plane mirror provided with a window, a concave dome-shaped cover provided with a central sighting opening under and covering said window, and a reflex non-scattering light reflector mounted on the concave face of said dome-shaped closure having a layer of small transparent spheres partially embedded in a reflecting binder.

3. A signaling device including a mirror with a window, a concave dome-shaped cover provided with a central sighting opening under and covering said window, a reflecting binding material on the concave face of said cover, and a multiplicity of small transparent spheres partially embedded in said binder.

4. A signaling device including a mirror with a window, a concave dome-shaped cover provided with a central sighting opening under and covering said window, a non-scattering reflex-reflecting layer on the concave face of said cover including a multiplicity of small transparent spheres, a binder partially embedding said spheres, and light reflecting means incorporated in said layer.

5. A signaling device including a mirror with a window, a concave dome-shaped cover provided with a central sighting opening under and covering said window, a transparent flexible reflex light reflector sheet having substantial stretch allowing conformation, a layer of small transparent spheres partially embedded in the sheet to provide a refracting light-returning layer of spherical lens elements, and light reflecting means incorporated behind the spheres to produce in combination therewith a non-scattering reflection of incident light when said sheet is mounted on the concave face of said cover.

RICHARD S. HUNTER.

REFERENCES CITED

The following references are of record in the file of this patent:

UNITED STATES PATENTS

| Number | Name | Date |
| --- | --- | --- |
| 992,043 | Parsons et al. | May 9, 1911 |
| 1,377,161 | Vanderbeek | May 3, 1921 |
| 1,552,166 | James | Sept. 1, 1925 |
| 1,949,138 | Bell | Feb. 27, 1934 |
| 2,187,057 | Sauer | Jan. 16, 1940 |
| 2,273,576 | Irby | Feb. 17, 1940 |
| 2,387,038 | Owens | Oct. 16, 1945 |
| 2,395,605 | Young | Feb. 26, 1946 |
| 2,412,616 | Hunter | Dec. 17, 1946 |

FOREIGN PATENTS

| Number | Country | Date |
| --- | --- | --- |
| 9,129 | Great Britain | Apr. 22, 1903 |
| 117,760 | Australia | Nov. 10, 1943 |

OTHER REFERENCES

"Time" Magazine, page 40, January 3, 1944. (Copy in Div. 34.)

"General Electric Review," pages 7, 8, and 9, May 1944. (Copy in Div. 34.)

"Jungle, Desert, Arctic Emergencies," U. S. Army Air Forces Flight Control Command, Safety Education Division. (Copy in Div. 34.)